April 3, 1928.
G. D. HANNA
1,665,058
MEANS FOR OBTAINING DATA IN EARTH BORES
Filed June 14, 1926
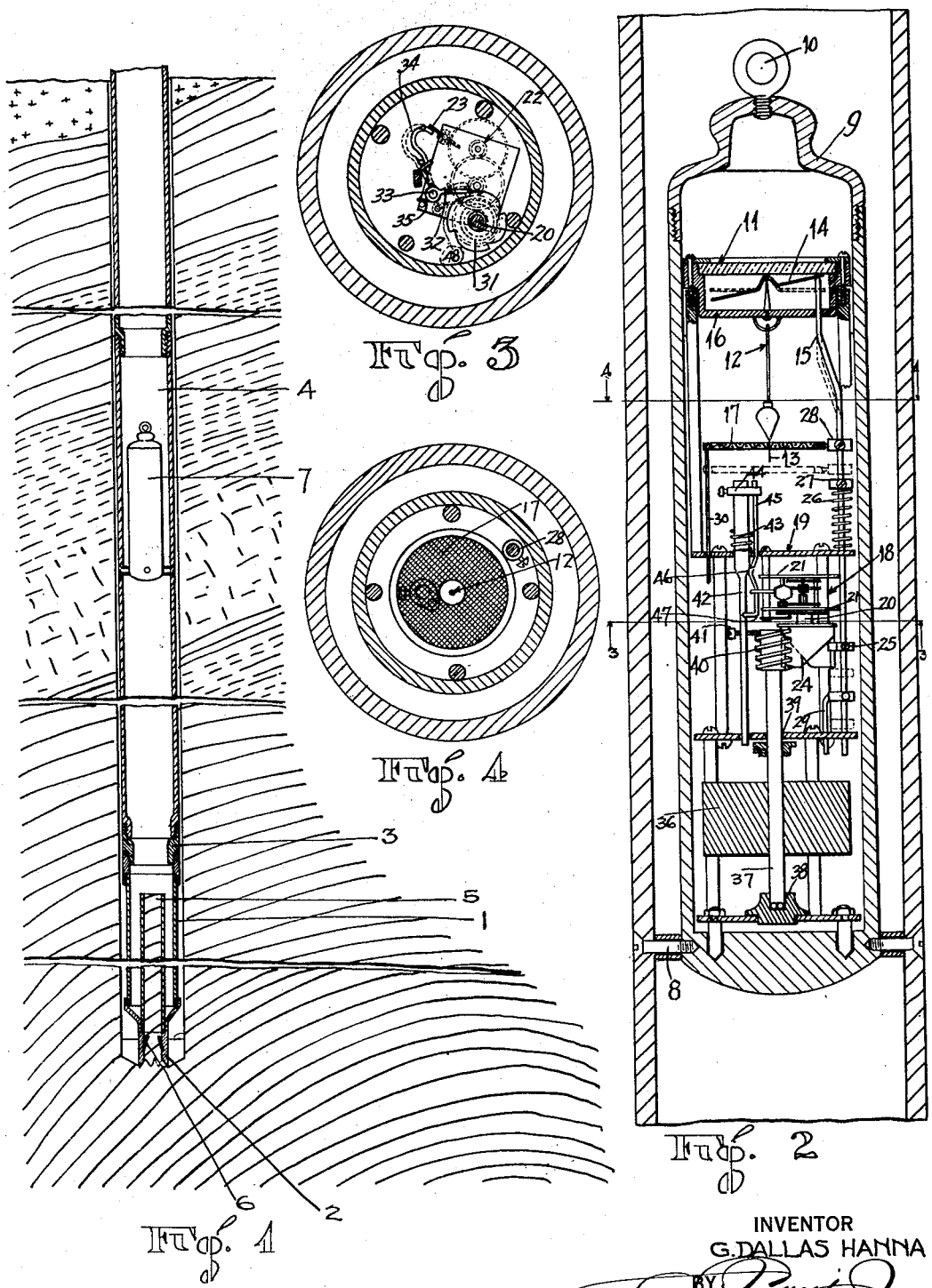
INVENTOR
G. DALLAS HANNA
BY
ATTORNEY Patented Apr. 3, 1928.

1,665,058

UNITED STATES PATENT OFFICE.

G. DALLAS HANNA, OF SAN FRANCISCO, CALIFORNIA, ASSIGNOR TO ASSOCIATED OIL COMPANY, OF SAN FRANCISCO, CALIFORNIA, A CORPORATION OF CALIFORNIA.

MEANS FOR OBTAINING DATA IN EARTH BORES.

Application filed June 14, 1926. Serial No. 115,736.

This invention relates to improvements in the art of obtaining data in earth bores and resides in the provision of means for determining the direction of the slope of the strata beneath the earth's surface and for also determining the angle of inclination of the bore as well as the angle of inclination of the strata and the direction of inclination of the bore, this invention being similar to my earlier invention disclosed in an application entitled Means for determining the direction of the slope of the strata beneath the earth's surface, Serial No. 82,667, filed January 21, 1926.

The main purpose of the present invention is to provide a means of a simple and inexpensive nature which may be readily and easily operated in conjunction with the ordinary test drilling apparatus for the purpose of accurately determining the inclination from the vertical of an earth bore, as in a well, mine shaft or the like, also for determination of the direction of such inclination and the angle of such inclination, and in addition the direction of the angle of inclination in test cores cut from formation in the drilling of wells or the sinking of shafts, etc.

The means of my invention makes possible the obtaining of accurate data of this nature in a simple and efficacious manner without necessitating the employment of complicated timing devices or mechanisms which must be controlled or operated from the surface of the bore. The apparatus of my invention will in no way interfere with or alter the usual operation of circulating the mud fluid in the well, as is customary, to remove the borings.

Another purpose of the invention is to provide a means of the character described which may be operated in less time and at a lower cost to procure more accuracy beneath the surface data in earth bores than has been possible with means such as heretofore employed, thereby making possible the securing of data from which the extent or area of a certain oil basin or pool can be readily and accurately determined.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a fragmentary vertical sectional view of apparatus of my invention as it would appear when in use.

Fig. 2 represents an enlarged vertical sectional view of the recording mechanism of the invention.

Fig. 3 represents a cross sectional view taken on the plane of line 3—3 of Fig. 2.

Fig. 4 represents a cross sectional view taken on the plane of line 4—4 of Fig. 2.

My invention may be carried out for obtaining data in mine shafts, wells and other types of earth bores but I have selected in this application as a means of illustrating my invention, an embodiment thereof which is adapted for use with apparatus similar to that generally employed for sinking test wells. This embodiment of the invention is carried out by combining with suitable test drilling apparatus of the present day type, a compass, either magnetic or gyroscopic, a plumb-bob and setting mechanism for the compass and plumb-bob. The purpose of the compass is to indicate the direction of the slope of the strata beneath the earth's surface in order that a definite compass point, such as the north point, may be established in the bore and on the sample or core. The plumb-bob is arranged so that it will indicate the inclination of the bore relative to the vertical. The compass and plumb-bob will also provide for determining the direction of the inclination of the bore and the angle of inclination of the test core removed from the earth.

Operatively associated with the compass is a means which automatically locks the compass needle at a predetermined time following the cessation of the drilling operation and before the breaking off of the test core, thereby recording the direction of the slope of the strata so that accurate data may be obtained. There is also provided a means which will automatically fix the plumb-bob in the position in which it hangs, immediately following the drilling operation and before breaking off of the test core, which means may operate co-incidentally with the compass locking means but not necessarily so, the main requirement being that it operate following the cessation of the drilling operation.

Various means for locking the plumb-bob and compass needle at the proper time may be employed but I prefer to use an automatically operated mechanism which is set into operation by the rotation of the drill and continues to operate after the rotation of the drill ceases, due to the momentum thereof, this continued operation bringing about the locking of the compass needle and plumb-bob at a predetermined time, say from 20 to 30 seconds after the drill rotation ceases, thereby allowing the compass needle to come to position of rest or quiet. This likewise permits the plumb-bob to come to a steady hanging position before it is locked in the indicating position and in this way accuracy is assured.

As shown in the accompanying drawing, the test drilling apparatus comprises an outer core barrel 1, which carries at its lower end an annular bit 2 and is attached at its upper end by a tool coupling 3 with a rotary operating string 4. The string 4 is rotated by any suitable means, not shown. Mounted within and spaced circumferentially from the outer core barrel 1, is an inner core barrel 5 adapted to receive the test core. Interiorly of the bit 2 and just below the lower end of the inner core barrel are spring fingers 6 which extend upwardly convergently, so as to prevent the core from dropping out of the inner barrel on lifting the core from the bore. These fingers also prevent rotation of the core relative to the inner core barrel.

The recording mechanism of my invention is mounted within the operating string although it may be mounted close to the inner core barrel or upon said barrel as desired, it being in the present instance, fitted above the inner core barrel within the string. This mechanism is contained in a suitable fluid tight casing or capsule 7 mounted in circumferentially spaced relation to the inner surface of the string and supported by suitable fastening means 8. The upper end of the barrel is closed by a removable cap 9 facilitating the mounting of the recording mechanism within and the removal thereof from the capsule. An eye 10 is carried on the upper side of the cap to facilitate the handling of the capsule. The capsule is preferably filled with non-corrosive liquid, such as gasoline, in order that the effect of the disparity of pressures encountered in the bore will be overcome.

A suitable compass 11 is mounted within the capsule 7, the compass being in the present instance of the magnetic type. In this connection it is to be noted that the capsule and mechanism contained therein, are preferably constructed of non-magnetic metal with possibly few exceptions as to small parts of the mechanism, which small parts will have no appreciable effect upon the compass. In addition I prefer to have the section of the string 4 in which the capsule is housed, formed of non-magnetic metal. In addition to the compass I mount within the capsule a plumb-bob 12, which in the present instance depends from the compass. The plumb-bob is of the ordinary type except that it is provided with a long, sharp point 13. The compass and plumb-bob are preferably mounted in the upper part of the capsule so that the mechanism which is associated therewith may be effectively disposed below them. The compass needle 14 is adapted to be held against movement or locked by means of a locking rod 15 which extends through the compass casing 16 and is adapted to be moved into and out of engagement with the compass needle. The plumb-bob is adapted to be locked or held by means of a reticulated disk 17 preferably made of fine mesh wire screen and which is adapted to be moved into and out of engagement with the pointed end 13 of the bob.

The mechanism for operating the locking means for the compass and plumb-bob comprises a spring motor 18 supported on a suitable frame work 19 within the capsule. This motor includes a spring driven main shaft 20 suitably journaled between opposed plates 21 for supporting the mechanism. This shaft is connected by a suitable train of gears indicated at 22 with a fan type governor 23. The resistance through this two plate fan type governor by the liquid in the capsule produces a slowing up of the spring motor as to the shaft 20, thus causing the desired speed of rotation of said shaft. Mounted on the shaft 20 is a double cam 24 adapted to engage and vertically reciprocate a lateral projection 25 on the lower part of the compass locking rod 15. An expansion spring 26 surrounding the compass rod and engaging a collar 27 on said rod and a part of the frame 19, tends to force said rod into locking position. The said rod is moved downward against the action of the spring by the double cam 24 engaging the projection 25. The plumb-bob locking member 17 is vertically adjustably mounted upon the rod 15 by means of a collar and set screw arrangement shown at 28. Both the rod 15 and the member 17 are provided with suitable guides 29 and 30 to prevent the rotation or turning movement of said members 15 and 17 and to insure their being moved freely in a vertical plane. The spring motor has a starting and stopping mechanism which includes a ratchet wheel 31 mounted on the main shaft 20 and with which a pawl 32 cooperates. This pawl is mounted on a small vertical shaft 33 which carries a lateral detent arm 34. A spring 35 is associated with the shaft 33 and said pawl so as to normally hold the detent arm 34 in holding engagement with the governor 23 thereby preventing operation of the spring motor.

When the pawl 32 is engaged with one of the four teeth of the ratchet wheel 31, which teeth are preferably long, the pawl 32 and the shaft are in such position that the detent arm will clear the governor 22 and permit the spring motor to operate so as to turn the shaft 20 through one-quarter of a revolution. When the pawl 32 moves off of one of the teeth thereof, the spring 35 operates immediately to move the detent back into locking position with relation to the governor and thereby stops the mechanism. There are four teeth on the ratchet and these teeth are of such length that they will maintain the detent out of holding position sufficiently long for the spring motor to turn the shaft 20 through one-quarter of a revolution. The projection on the rod 15 will be moved its full extent upward or downward on the double cam 24, this being sufficient to move the rod 15 into or out of locking engagement with the handle, as the case may be and to likewise move the plumb-bob lock member 17 into and out of locking position.

It is necessary to provide a means for automatically starting and stopping the spring motor at the proper time with relation to the test drilling operation. I prefer to employ an inertia motor for this purpose, which motor comprises a comparatively solid, heavy rotor 36 which may be made of lead or any other suitable material and is fixed upon a vertical shaft 37 journaled in suitable bearings 38 and 39 within the lower part of the capsule. The construction of this rotor is such that it will lag behind the speed of rotation of the drill and will continue to rotate after the drill has ceased operation, due to the momentum thereof. On the vertical shaft 37 is a worm gear 40 which is engaged by the lateral tooth or projection 41 carried on a vertically movable rod 42 suitably supported in the frame work 19. As said worm gear 40 rotates with respect to the rod 42 and its projection 41 said rod 42 is caused to move up and down, as the case may be, by engagement of the projection 41 with the worm gear. A light compression spring 43 is mounted on the rod 42 and at its lower end engages a part of the frame work beneath it. A collar 44 adjustably mounted upon the upper end of the rod 42 is adapted to engage and compress said spring when the rod 42 is in its down position thereby holding the tooth or projection 41 against the lower end of the worm gear in such position that it will be maintained in proper relation to said gear for upward travel on the side of the gear when the latter commences to rotate upon cessation of the drilling operation. Extending downwardly from the collar 44 alongside the rod 42 is a setting rod 45 provided between its ends with a V-shaped kink or bend 46 and at its lower end with a right angularly bent stop portion 47. This rod moves up vertically in contact with the detent arm so that when the V-shaped bend 46 encounters the detent arm, it will move said arm out of holding position with respect to the governor 23, regardless of whether the setting rod 45 is moved upward or downward. In this way the inertia motor and associated mechanism provides for starting and stopping the spring motor.

*Operation.*

When a test drilling operation is carried out with the apparatus of this invention and the drill has been advanced in the bore to the point where the test core is to be taken, the apparatus will appear as shown in Fig. 1. When the drill commences to rotate, preliminary to taking the test core, the bit 2 operates to force the earth in the bottom of the bore up into the inner core barrel 5 as is customary in the art. At the start of the drilling operation, both the plumb-bob and the compass needle are locked and the mechanism as a whole is in the position shown in Fig. 2. The inherent inertia of the rotor causes it to lag thus several revolutions of the drill are completed before the rotor begins to turn. The tooth or lateral projection 41 is therefore turned in a planetary movement around the worm and is thereby moved downward on the worm before the rotor begins to turn. If the rotor begins to turn the speed of rotation of the drill and tooth 41 is greater than that of the rotor so the tooth would at any rate advance downward and move with it the rod 42. When the rod 42 is moved down, the setting rod 45 is likewise moved downward to the extent that the V-shaped bend 46 therein will engage and move out the detent arm 34. As soon as the detent arm 34 is moved clear of the governor 23, the spring motor operates so as to turn the shaft 20 through one-quarter of a revolution in a clock-wise direction. Before this movement of the shaft takes place, the cam 24 is in the position shown in Fig. 2, with the lateral projection 25 at the highest point on the cam. Therefore when the cam rotates through a quarter of a revolution with the shaft 20, it pushes downward on the member 25 until said member is moved to the dotted showing thereof in Fig. 2 and engaged beneath the horizontal or lateral edge of the cam. This downward movement of the lateral projection 25 moves the rod 15 downward clear of the compass needle and thereby unlocks the compass.

The locking member 17 is also moved downward and frees or unlocks the plumb-bob 12. The engagement of the projection 25 with the lateral or straight edge of the cam, maintains the locking rod 15 and the member 17 in position clear of the compass needle and plumb-bob. The V-shaped bend 46 of the rod 45 moves past the detent arm 34 before said rod 45 has completed its downward movement, thereby freeing the detent arm, but the detent arm is held clear of the governor by the engagement of the pawl 32 with one of the teeth of the ratchet 34 and is maintained in this position until the one-quarter revolution of the cam has been completed, at which time the pawl moves off of the end of the tooth and the spring 35 operates to move the shaft 33 and detent arm back into position to engage and stop the rotation of the governor 23, thus limiting the operation of the clock-work mechanism to one-quarter turn of the shaft 20 and cam 24. When the tooth or lateral projection 41 moves downward to the lower end of the worm, the downward movement of the rod 45 ceases. The spring 43 is then compressed by being engaged by the collar 44 on the rod 42 and thereby holds the tooth or projection 41 in proper position to be picked up by the worm gear when the latter commences to rotate relative to said tooth. This rotation of the worm gear relative to the tooth does not take place however, until the drilling operation ceases. When it is determined that the inner core barrel contains a full test core, the operation of the drill is stopped and at this time the momentum of the rotor 36 is such that said member 36 continues to rotate after the drilling operation is stopped. As soon as the drilling operation stops, the worm gear operates to move the tooth 41 and rod 42 upwardly. The mechanism may be timed and arranged so that from 20 to 30 seconds after the drill stops, the member 41 will have been moved upward to the extent that the V-shaped portion on the rod 45 will have engaged and moved outward the detent arm 34, thus permitting the spring motor to operate. The spring motor again operates as previously described but this time so that the projection 25 is permitted to move upward on the double cam into its uppermost position. The spring 26 being compressed before this operation causes the rod 15 to move upward and to engage and lock the compass needle 14 by pressing the needle against the top of the casing. The pawl and ratchet mechanism again operates to cause the detent arm to move back into position to be engaged by and to prevent operation of the governor 23, thus stopping the spring motor immediately when the rod 15 is moved into position to engage and lock the compass needle. Coincidentally with the upward movement of the rod 15 into locking position, the reticulated disk or screen 17 moves upward so that the pointed end 13 of the plumb-bob projects through one of the apertures in the screen thereby locking the plumb-bob in the position in which it hanges and determining the angle of the inclination of the bore and the angle of the inclination of the test core. The period of time which elapses between the cessation of the drilling operation and the locking of the compass needle and plumb-bob may be varied as desired, the main requirement being that such time elapse as will permit the compass needle to come to a position of quiet or rest, pointing due north, and for the plumb-bob to likewise come to position of rest, ordinarily from 20 to 30 seconds being of sufficient time. In this way an accurate determination of the factors desired is provided for. Following the locking of the compass needle and plumb-bob, the drill is lifted and the test core is broken off from the strata from which it is taken. When the apparatus is brought to the surface the cover 9 of the capsule is removed, and the north point, as indicated by the locked compass needle 14, is suitably marked both on the capsule and on the core as the latter is removed from the inner core barrel 5. The entire mechanism is then removed from the capsule so that the position of the locked plumb-bob on the screen 17 may be determined. This position gives both the angle and direction of inclination of the bore, which can then properly be related to the core, the latter having previously been marked with the north point as described.

The spring shown in dotted lines at 48 which operates the shaft 20, may be wound after each operation of the instrument if desired, by using the cam 24 as a handle in the winding operation.

I claim:

1. An apparatus for the described purpose comprising a body adapted to be lowered into a bore hole; direction indicating means carried thereby; a member associated with said body and adapted for movement relative thereto and independent of the movement of said indicating means; and means actuated by the inertia of said movable member for controlling the operation of said direction indicating means.

2. An apparatus for the described purpose comprising a body adapted to be lowered into a bore hole; direction indicating means carried thereby; and means controlled by inertia for recording the indication of said indicating means.

3. An apparatus for the described purpose comprising a body adapted to be lowered into a bore hole; direction indicating means carried thereby; and means controlled by inertia for locking said indicating means.

4. An apparatus for the described purpose comprising a body adapted to be lowered into a bore hole; direction indicating means carried thereby; a member movably associated with said body; and means actuated by the inertia of said movable member for locking said indicating means.

5. An apparatus for the described purpose comprising a body adapted to be lowered into a bore hole; means carried thereby for taking and holding a sample core; a compass carried by said body; and means controlled by inertia for preserving a record of the indication of said compass.

6. An apparatus for the described purpose comprising a body adapted to be lowered into a bore hole; means carried thereby for taking and holding a sample core; a compass carried by said body; and means controlled by inertia for locking said compass.

7. An apparatus for the described purpose comprising a body adapted to be lowered into a bore hole; a compass carried by said body; a plumb-bob carried by said body; and means controlled by inertia for simultaneously locking said compass and said plumb-bob.

8. An apparatus for the described purpose comprising a body adapted to be lowered into a bore hole; a compass carried by said body; a plumb-bob carried by said body; and means controlled by inertia for preserving a record of the simultaneous indications of said compass and said plumb-bob.

9. An apparatus for the described purpose comprising a body adapted to be lowered into a bore hole; a plumb-bob carried thereby; a member mounted beneath said plumb-bob and movable into engagement therewith; and means controlled by inertia for moving said member.

10. An apparatus for the described purpose comprising a body adapted to be lowered into a bore hole; direction indicating means carried thereby; a member movably associated with said body; and mechanism set in motion by the inertia of said member and adapted to control the operation of said indicating means after a predetermined time interval.

11. An apparatus for the described purpose comprising a body adapted to be rotated in a bore hole; direction indicating means carried thereby; a member rotatably associated with said body; means actuated by rotation of said member relatively to said body for locking and unlocking said indicating means according to the direction of such rotation.

G. DALLAS HANNA.